J. P. HAYES.

Cooking Range.

No. 10,097.

2 Sheets—Sheet 1.

Patented Oct. 4, 1853.

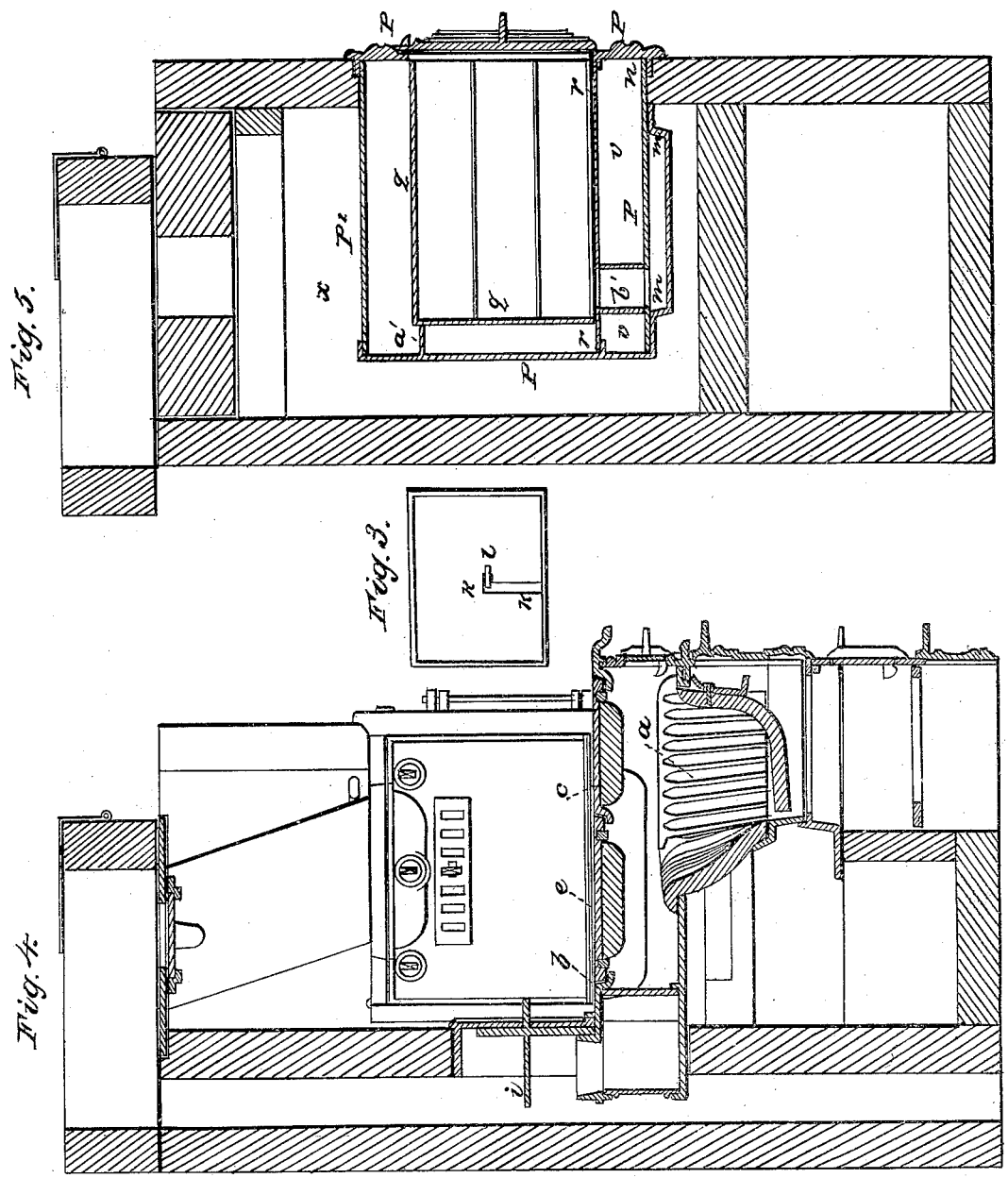

UNITED STATES PATENT OFFICE.

JOHN P. HAYES, OF BOSTON, MASSACHUSETTS.

COOKING-RANGE.

Specification of Letters Patent No. 10,097, dated October 4, 1853.

*To all whom it may concern:*

Be it known that I, JOHN P. HAYES, of Boston, in the county of Suffolk and State of Massachusetts, have invented certain new and useful Improvements in Cooking-Ranges, and that the following description, taken in connection with the accompanying drawings, hereinafter referred to, forms a full and exact specification of the same, wherein I have set forth the nature and principles of my said improvements, by which my invention may be distinguished from others of a similar class, together with such parts as I claim and desire to have secured to me by Letters Patent.

The figures of the accompanying plates of drawings represent my improvements.

Figure 1:
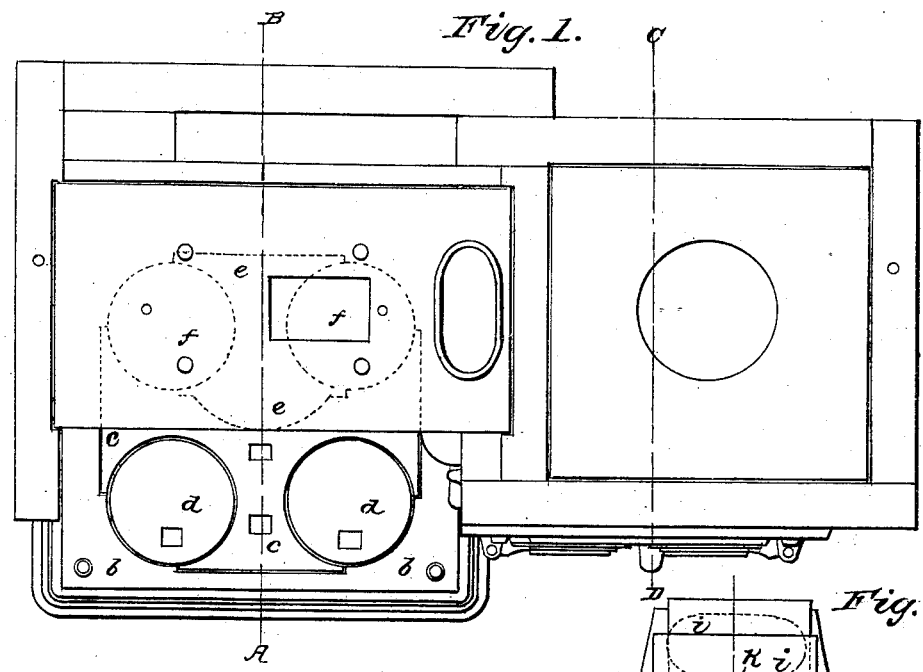
Figure 2:
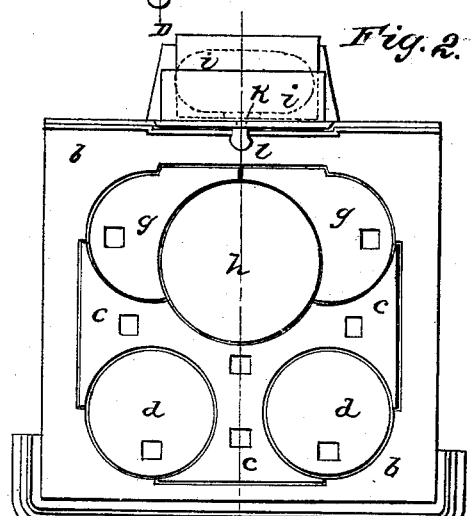
Figure 6:
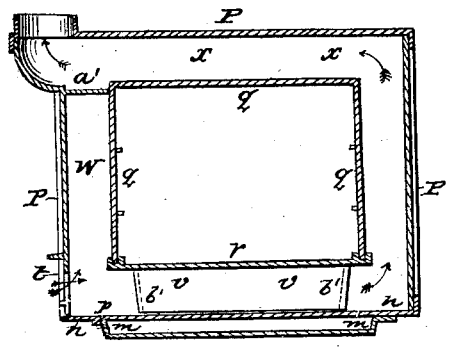

In Plate 1, Figure 1 is a plan or top view of the range. Fig. 2 is a plan of part of the same, showing the manner of using the plates over the fire chamber. Fig. 3 is a detail view which will be hereinafter referred to. In Plate 2, Fig. 4 is a transverse vertical section of the range taken in the plane of the line A B, Fig. 1, Pl. 1. Fig. 5 is a vertical section taken in the plane of the line C D, Fig. 1. In Plate 3, Fig. 6 is a longitudinal vertical section of the oven.

My improvements are made upon a cooking range for which Letters Patent of the United States were granted to me, bearing date the 27th day of January 1852, and described in the schedule annexed to the same. The principal features of my improvements consist in a new form of oven, and in an arrangement for preventing the smell of anything which is being cooked in the oven from passing into the hot air chamber and penetrating into the apartments, which are heated by the range, an objection which has hitherto been experienced in nearly all cooking ranges.

$a$ $a$ in the drawings represents the fire pot with a plate $b$ $b$ over it into which fits the plate $c$ $c$ $c$, with apertures $d$, $d$ for boiling purposes. When the range is being used for boiling purposes &c., the plate $e$ $e$ can be used with the plate $c$ $c$ $c$, leaving two apertures $f$, $f$, on the back—or with the pieces $g$, $g$ leaving a large aperture $h$. It will be seen that by transposing the position of the plate $c$ $c$ and the pieces $g$ $g$ the large aperture $h$ can be brought to the front or either side of the range.

The smoke flue is opened and closed by a peculiar damper $i$ $i$ which slides up and down in a vertical and horizontal slot $k$ $k$, as shown in Fig. 3, Pl. 1, the damper being held up in the horizontal part of the slot, by a shoulder on the handle $l$.

In the range before patented by me, the hot air passed from the hot air chamber up through a damper in the bottom of the oven, as described in the schedule above referred to. When this damper was open, anything which was being cooked in the oven, would, in case it was carelessly handled, drop through the damper into the hot air chamber, from which the effluvia would afterward be conveyed to the apartments which were heated by the range. In order to remedy this inconvenience, I use, instead of a damper, a box or receiving flue $m$ $m$, attached to the bottom plate $n$ $n$ of the oven and opening into the same as shown in Fig. 5, Pl. 2. This flue is also open at the end nearest the fire chamber, so that the hot air passes into the flue $m$ $m$ and then into the oven. By this arrangement anything which is spilled in the oven will be caught by the receiving flue $m$ $m$, which can readily be cleaned out, thus effectually preventing any offensive smell from entering the apartments which are warmed by the range.

My improvement in the oven consists in so combining a movable or sliding oven with the flues about the same, as to cause the smoke &c., not only to pass entirely about, but also the hot air to pass into the oven, this desideratum being effected without any descending draft, while the oven can be readily removed for cleaning the flues. $p$, $p$, $p$, $p$ in the drawings represents the outer casing of the oven and $q$, $q$ $q$ the inner movable oven, composed of three sides and the top, the bottom being formed by the stationary plate $r$, attached to the outer casing $p$ $p$, on which plate the oven can be moved in or out. The smoke &c., from the fire pot $a$ passes through the aperture $t$ and then passes, as shown by the arrows in the drawings, into the flue $v$ $v$ under the oven and the flue $w$ $w$ on the side nearest the fire pot, from which flues it passes about and over the oven through the flue $x$ $x$ into the smoke pipe, the smoke &c., being made to pass around the oven by the partition $a'$ $a'$, which prevent it from passing directly into the smoke flue. The hot air is received from the chamber about the fire pot into the receiving flue *m m*, and then passes through a box flue *b' b'* into the oven.

Having thus described my improvements in cooking ranges I shall state my claims as follows:

What I claim as my invention and desire to have secured to me by Letters Patent is—

1. I claim the receiving or box flue *m m*, formed under the oven in the manner above described and for the purpose specified.

2. I claim so combining a movable oven sliding upon a stationary bottom through which the hot air is admitted, with the smoke flues about the same, as to cause the smoke &c., to pass about and over the oven, and the hot air to pass into the same as above described.

JOHN P. HAYES.

Witnesses:
JOSEPH GAVETT,
EZRA LINCOLN.